(12) United States Patent
Hellstrom

(10) Patent No.: US 8,191,943 B2
(45) Date of Patent: Jun. 5, 2012

(54) CRASH BOX FOR A VEHICLE

(75) Inventor: Jonas Hellstrom, Sodra Sunderbyn (SE)

(73) Assignee: Gestamp Hardtech AB, Lulea (SE)

( * ) Notice: Subject to any disclaimer, the term of this patent is extended or adjusted under 35 U.S.C. 154(b) by 0 days.

(21) Appl. No.: 12/737,269

(22) PCT Filed: Jun. 30, 2009

(86) PCT No.: PCT/SE2009/000334
§ 371 (c)(1),
(2), (4) Date: Mar. 29, 2011

(87) PCT Pub. No.: WO2010/002309
PCT Pub. Date: Jan. 7, 2010

(65) Prior Publication Data
US 2011/0181063 A1    Jul. 28, 2011

(30) Foreign Application Priority Data
Jul. 1, 2008  (SE) ........................................ 0801552

(51) Int. Cl.
*B60R 19/26* (2006.01)
(52) U.S. Cl. ........................ 293/132; 293/102; 188/371

(58) Field of Classification Search ................ 293/102, 293/132, 133, 153, 154; 188/371, 377; 296/187.03, 296/187.09
See application file for complete search history.

(56) References Cited

U.S. PATENT DOCUMENTS

| | | | |
|---|---|---|---|
| 4,311,335 A * | 1/1982 | Winiecki ..................... 296/78.1 |
| 5,876,077 A | 3/1999 | Miskech et al. | |
| 5,984,390 A | 11/1999 | Kemp et al. | |
| 6,971,690 B2 * | 12/2005 | Evans et al. ................... 293/102 |
| 7,357,432 B2 * | 4/2008 | Roll et al. ..................... 293/133 |
| 7,407,219 B2 * | 8/2008 | Glasgow et al. .......... 296/187.03 |
| 2004/0256867 A1* | 12/2004 | Evans et al. .................... 293/102 |
| 2006/0125254 A1* | 6/2006 | Arns et al. ..................... 293/155 |
| 2006/0290149 A1* | 12/2006 | Roll et al. ..................... 293/133 |
| 2008/0224487 A1* | 9/2008 | Wang et al. ..................... 293/132 |
| 2009/0026777 A1* | 1/2009 | Schmid et al. ................ 293/133 |

FOREIGN PATENT DOCUMENTS

DE     19751513 A1   6/1999
EP      1762438 A1   3/2007

* cited by examiner

Primary Examiner — Lori Lyjak
(74) Attorney, Agent, or Firm — Mark P. Stone

(57) ABSTRACT

A crash box for a vehicle is made from a sheet blank (10) which is bent in a U to form the front plate (11), a top side (12) and a bottom side (13), and the top side and bottom side are bent to form overlapping flaps (16-19) which are joined together at the overlapping, and to form rear fastening plates (14,15).

2 Claims, 2 Drawing Sheets

CRASH BOX FOR A VEHICLE

FIELD OF THE INVENTION

The invention deals with a crash box for a vehicle, with front plate for attachment to a bumper beam and rear fastening plate for attachment to the vehicle.

BACKGROUND OF THE INVENTION

Bumper beams are often secured in a pair of crash boxes which in turn are attached to the vehicle, often to its side rails. U.S. Pat. No. 7,344,008 B1 is one example of such a crash box.

PURPOSE AND BRIEF DESCRIPTION OF THE INVENTION

One purpose of the invention is to afford greater geometrical freedom in the design of crash boxes and to enable greater depth without increasing the manufacturing costs.

This purpose is fulfilled when a sheet blank is bent in a U to form the front plate, a top side and a bottom side, and the top side and bottom side are bent to form overlapping flaps which are joined together at the overlapping, and to form rear fastening plates. The invention is defined by the patent claims.

SHORT DESCRIPTION OF THE DRAWINGS

DESCRIPTION OF THE DEPICTED EXAMPLE OF THE INVENTION

Figure 1:
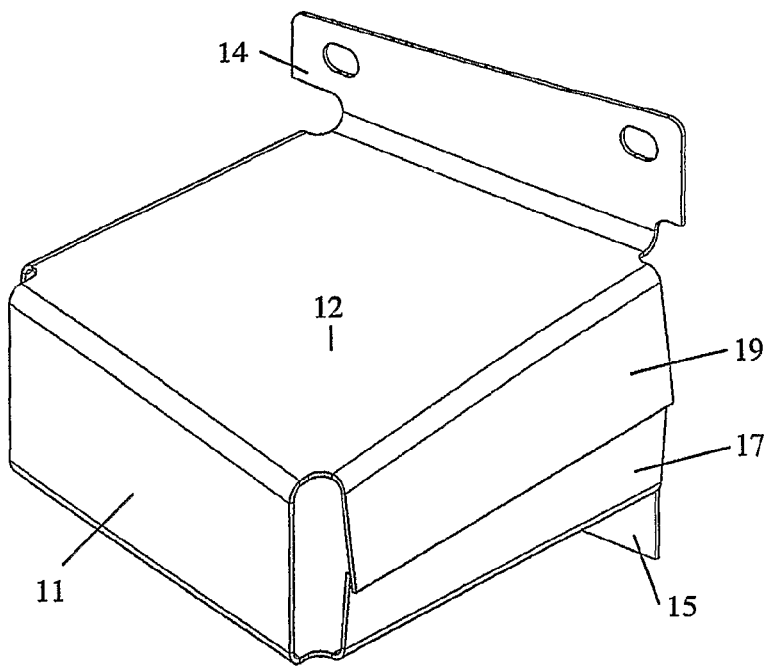
FIG. 1 is an isometric view of a crash box shown as an example of the invention.
Figure 2:
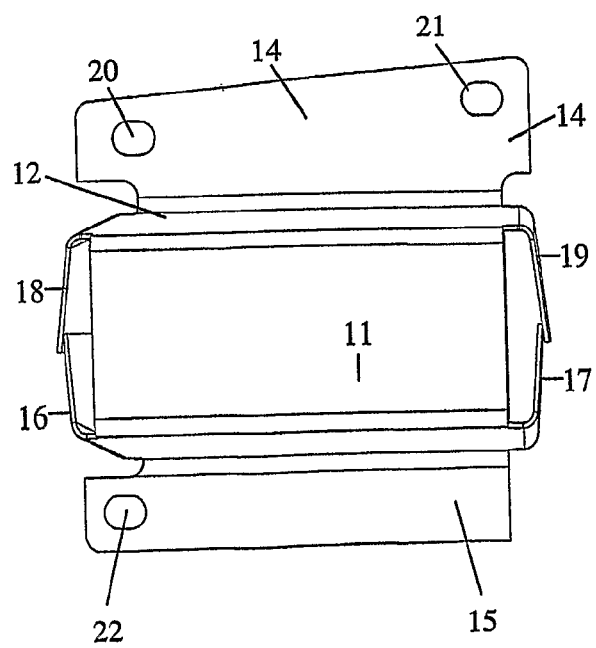
FIG. 2 is a view of the same crash box seen from the front.
Figure 3:
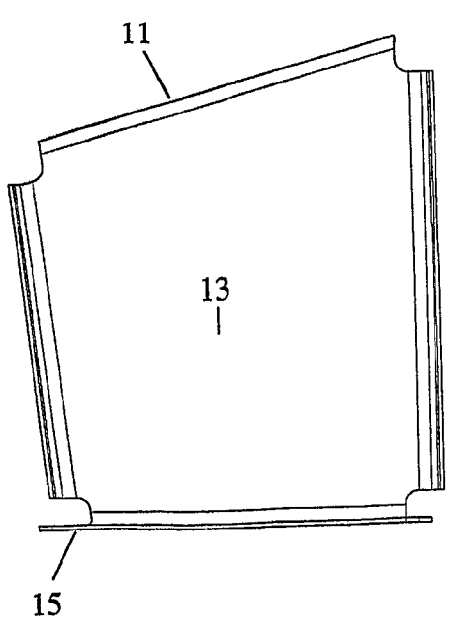
FIG. 3 is a view of the same crash box seen from below.
Figure 4:
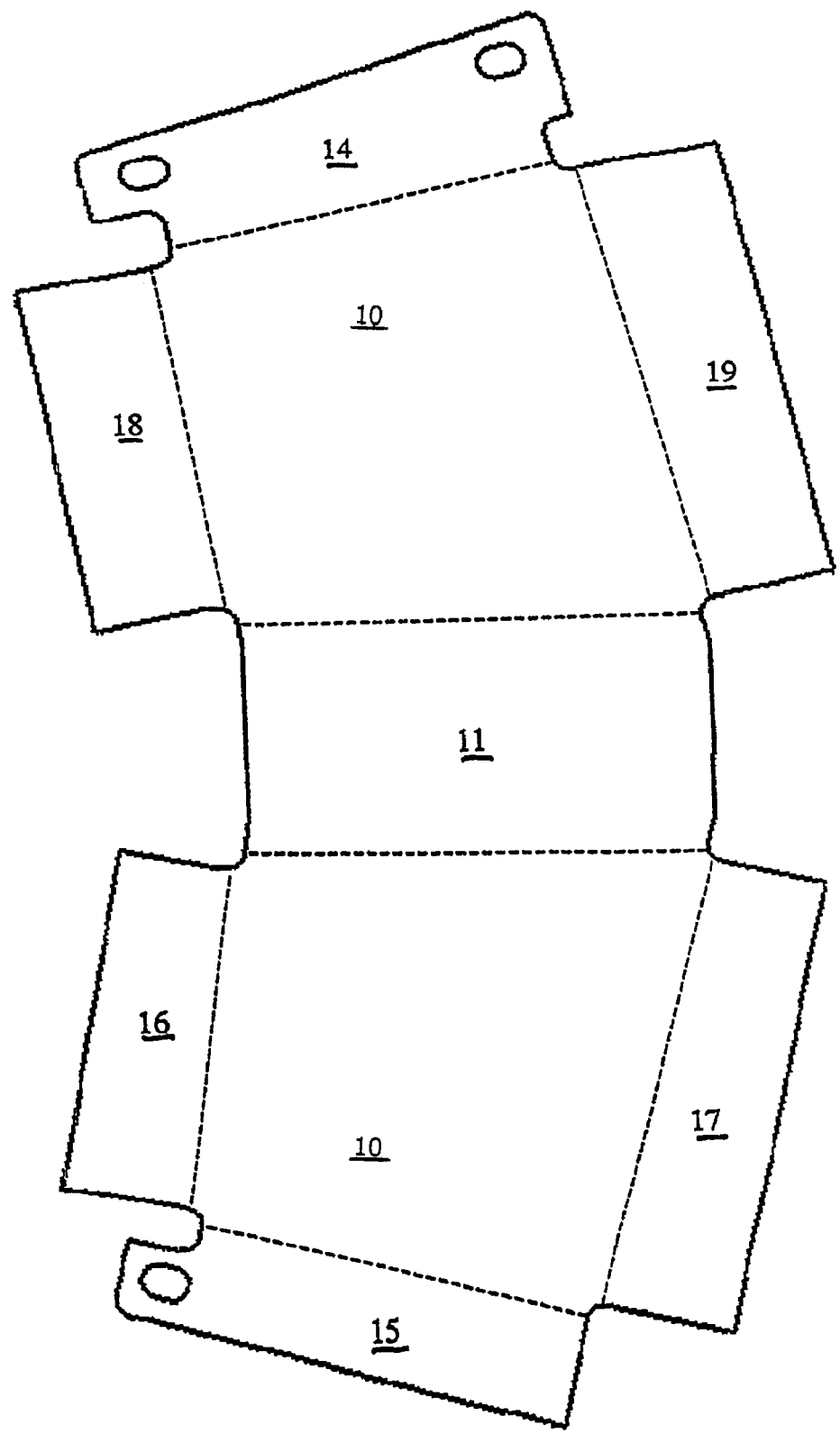
FIG. 4 shows the sheet blank from which the crash box is made.

The crash box is bent from a flat sheet blank 10 as shown in FIG. 4 to make a front plate 11, a top side 12, and a bottom side 13. The top side has a rear flap bent up to form an upper fastening plate 14 and the bottom side 13 has a rear flap bent down to form a lower fastening plate 15. The bottom side 13 has side flaps 16,17 bent up and the top side 12 has corresponding side flaps 18,19 bent down and overlapping the flaps of the bottom side. In the overlap, the flaps are joined together, preferably by welding. The different parts of the crash box are also indicated on the blank 10 in FIG. 4 and the bending lines are shown as broken lines.

A bumper beam, not shown, is supported by two crash boxes, attached to a supporting part of the vehicle. The crash boxes in this case are slanting and mirror images of each other, but only one of the crash boxes is depicted and described. The slanting in this case is because they are adapted to a bumper beam shaped like an arch. The front plate of the crash box is attached, advisedly by welding, to the bumper beam, and the bumper, i.e., the bumper beam with the two crash boxes is attached to a supporting part of the vehicle. The fastening plates 14, 15 have holes 20,21,22 for bolts to fasten the crash box to the vehicle.

The invention claimed is:

1. Crash box for a vehicle, with front plate (11) for attachment to a bumper beam and rear fastening plate (14,15) for attachment to the vehicle, characterised in that a sheet blank (10) is bent in a U to form the front plate (11), a top side (12) and a bottom side (13), and the top side and bottom side are bent to form overlapping flaps (16-19), which are joined together at the overlapping, and to form rear fastening plates (14,15).

2. Crash box according to claim 1, characterised in that the overlapping flaps are welded together.

* * * * *